United States Patent
Surazski

(10) Patent No.: US 7,277,943 B1
(45) Date of Patent: Oct. 2, 2007

(54) DEVICES, SOFTWARE AND METHODS FOR ALLOCATING JITTER BUFFER MEMORY BASED ON NETWORK REGION OF NETWORK ENDPOINT

(75) Inventor: Luke Surazski, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1305 days.

(21) Appl. No.: 09/832,422

(22) Filed: Apr. 10, 2001

(51) Int. Cl.
G06F 15/173 (2006.01)

(52) U.S. Cl. .................. 709/226; 709/223; 370/516

(58) Field of Classification Search ............. 709/226, 709/223, 224; 711/170–172; 710/56; 370/516–517
See application file for complete search history.

(56) References Cited

U.S. PATENT DOCUMENTS

| | | | | |
|---|---|---|---|---|
| 5,790,543 A * | 8/1998 | Cloutier ................ 370/252 |
| 6,360,271 B1 * | 3/2002 | Schuster et al. ............ 709/231 |
| 6,434,606 B1 * | 8/2002 | Borella et al. ............. 709/214 |
| 6,665,317 B1 * | 12/2003 | Scott ....................... 370/516 |
| 6,678,250 B1 * | 1/2004 | Grabelsky et al. .......... 370/241 |
| 6,788,651 B1 * | 9/2004 | Brent et al. ................ 370/255 |
| 6,816,464 B1 * | 11/2004 | Scott et al. ................. 370/252 |
| 6,859,460 B1 * | 2/2005 | Chen ......................... 370/412 |
| 6,862,298 B1 * | 3/2005 | Smith et al. ............... 370/516 |
| 6,990,112 B1 * | 1/2006 | Brent et al. ................ 370/401 |
| 2002/0001302 A1 * | 1/2002 | Pickett ...................... 370/352 |
| 2002/0087370 A1 * | 7/2002 | Brueckheimer et al. ....... 705/7 |
| 2002/0101885 A1 * | 8/2002 | Pogrebinsky et al. ....... 370/516 |
| 2002/0129161 A1 * | 9/2002 | Lloyd et al. ............... 709/238 |
| 2002/0184393 A1 * | 12/2002 | Leddy et al. .............. 709/250 |
| 2004/0218739 A1 * | 11/2004 | Nicol ...................... 379/93.33 |

* cited by examiner

Primary Examiner—William Vaughn
Assistant Examiner—LaShonda Jacobs
(74) Attorney, Agent, or Firm—Marger Johnson & McCollom, P.C.

(57) ABSTRACT

Devices, software and methods are provided for allocating different amounts of memory of a network communication device as jitter buffer for different channels, such as VoIP connections. The channels are classified according to regions of their endpoints in the network. Jitter statistics are tracked for connections with endpoints in each region. The statistics are used to determine how much memory to allocate as a jitter buffer for each channel in a subsequent connection, depending on the region of the endpoint.

13 Claims, 5 Drawing Sheets

DEVICES, SOFTWARE AND METHODS FOR ALLOCATING JITTER BUFFER MEMORY BASED ON NETWORK REGION OF NETWORK ENDPOINT

BACKGROUND OF THE INVENTION

1. Field of the Invention

The present invention is related to the field of communications over networks, and more specifically to devices, software and methods for allocating jitter buffer memory in a network communication device.

2. Description of the Related Art

Networks are used increasingly for communications, such as voice communications. Communications through networks take place according to protocols, such as the Internet Protocol (IP). If the communication is for voice, then a Voice over Internet Protocol (VoIP) is used.

Referring to FIG. 1, an arrangement is shown for a network communication scheme. A transmitter 20 establishes a connection, such as a VoIP connection, with a receiver 30, that includes a jitter buffer 32. The connection is through a network 40, which is also known as an IP cloud 40. For this arrangement, transmitter 20 is considered to be a network endpoint from the point of view of receiver 30.

Transmitter 20 decomposes the input signal in small parts, and codes the parts in sequential packets 24. Coded packets 24 are designated P1, P2, P3 and P4, to indicate their relative sequence. Coded packets 24 are input in IP cloud 40.

The coded packets travel though the IP cloud 40 as traveling packets 44. Traveling packets 44 are designated T1, T2, T3 and T4, corresponding in content to P1, P2, P3 and P4 respectively. An important aspect of IP cloud 40 is that, even though coded packets 24 were received from a single source and in a certain sequence, traveling packets 44 may travel through different paths of IP cloud 40, and with differential delays between them.

Indeed, traveling packets 44 may arrive at a different order in jitter buffer 32, as received packets 54. Received packets 54 are designated R1, R2, R3 and R4, corresponding in content to P1, P2, P3 and P4 respectively. It will be observed that received packets R1, R2 were delayed more than received packets R3, R4, and thus appear after them.

Receiver 30 reconstructs the original signal by playing out the received packets 54 as output packets 64. Output packets 64 are designated O1, O2, O3 and O4, corresponding in content to packets P1, P2, P3 and P4 respectively. Since the played out sequence is the same as the input sequence, the signal is reconstructed faithfully.

In reviewing this scheme, jitter buffer 32 is necessary because of the uncertainty in travel time of travel packets T1, T2, T3, T4 44 through IP cloud 40. Indeed, if there were a direct communication line, the packets would be guaranteed to arrive in the original sequence, and each with the same delay as the others.

Jitter buffer 32 works by having a memory to store packets as they are received, until they are played out in the originally intended sequence. The larger the memory, the larger the probability that, regardless of differential delays by IP cloud 40, a packet will have been received by the time it is due to be played out. This improves quality of service, and is especially important for voice communications.

Chips are being created for network communications. These chips have high processing power, but their cost is driven by the amount of memory they are associated with. In IP telephony applications, a relatively large portion of this memory is allocated for jitter buffer storage. For example, enough storage is allocated for 200 msec of conversation, for each VoIP connection (also known as channel) that is established.

BRIEF SUMMARY OF THE INVENTION

The present invention overcomes these problems and limitations of the prior art.

Generally, the present invention provides devices, software and methods for allocating jitter buffer memory in a network communication device. The invention recognizes that different amounts of jitter are produced by channels with endpoints in different regions of the network. The invention allocates memory to the individual channels in accordance with their individual expected needs. The needs are projected from classifying the channels according to the region of their endpoints in the network, and by tracking jitter performance from the regions.

The invention offers the advantage that memory is conserved, by being allocated more according to need. Large, preset memory allocations become unnecessary for very good connections, which generates savings. In addition, even though different amounts of memory may be allocated to different channels, quality of service may be uniform for many channels.

The invention will become more readily apparent from the following Detailed Description, which proceeds with reference to the drawings, in which:

DETAILED DESCRIPTION OF THE PREFERRED EMBODIMENT(S)

As has been mentioned, the present invention provides devices, software and methods for allocating jitter buffer memory in a network communication device. The invention is now described in more detail.

Figure 1:
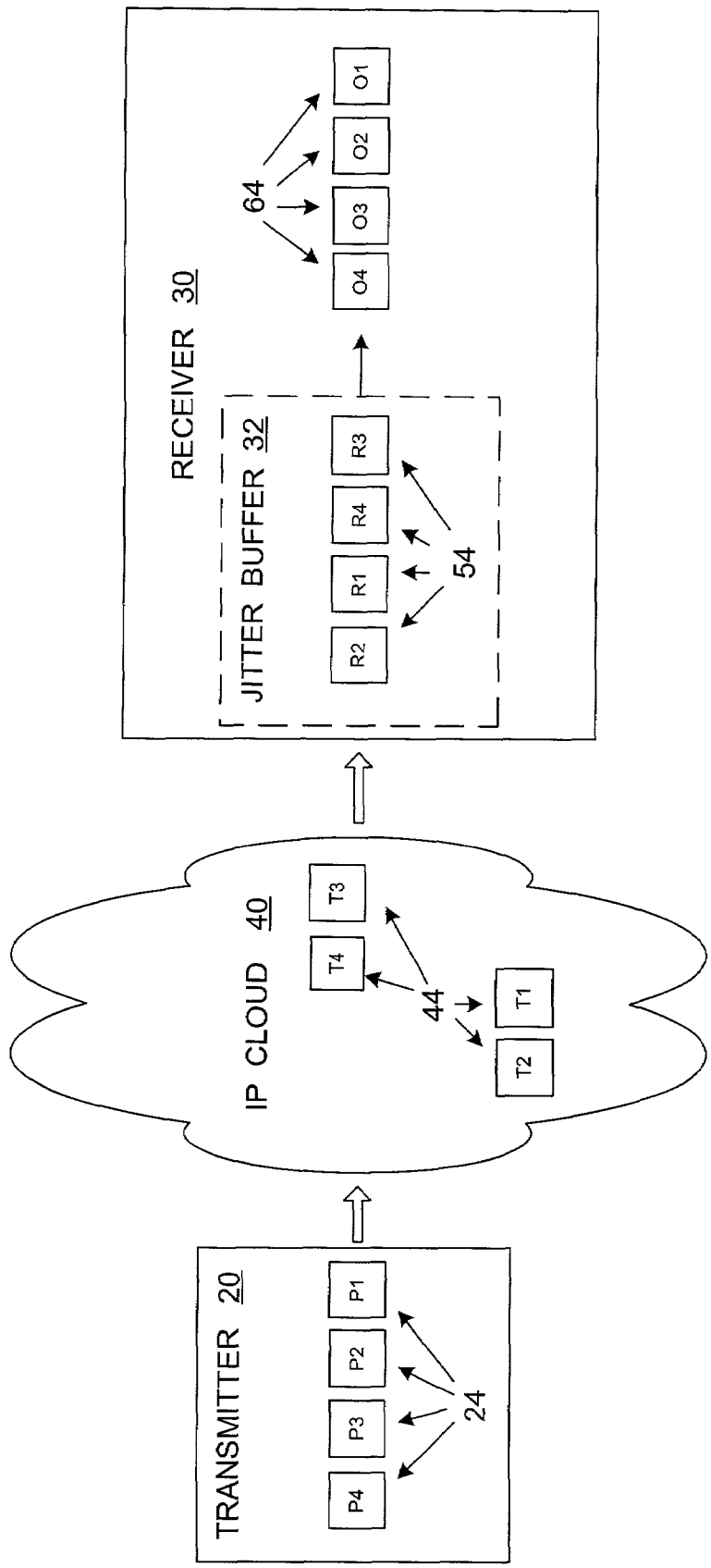
FIG. 1 is a diagram for illustrating the function of a jitter buffer in the prior art.
Figure 2A:
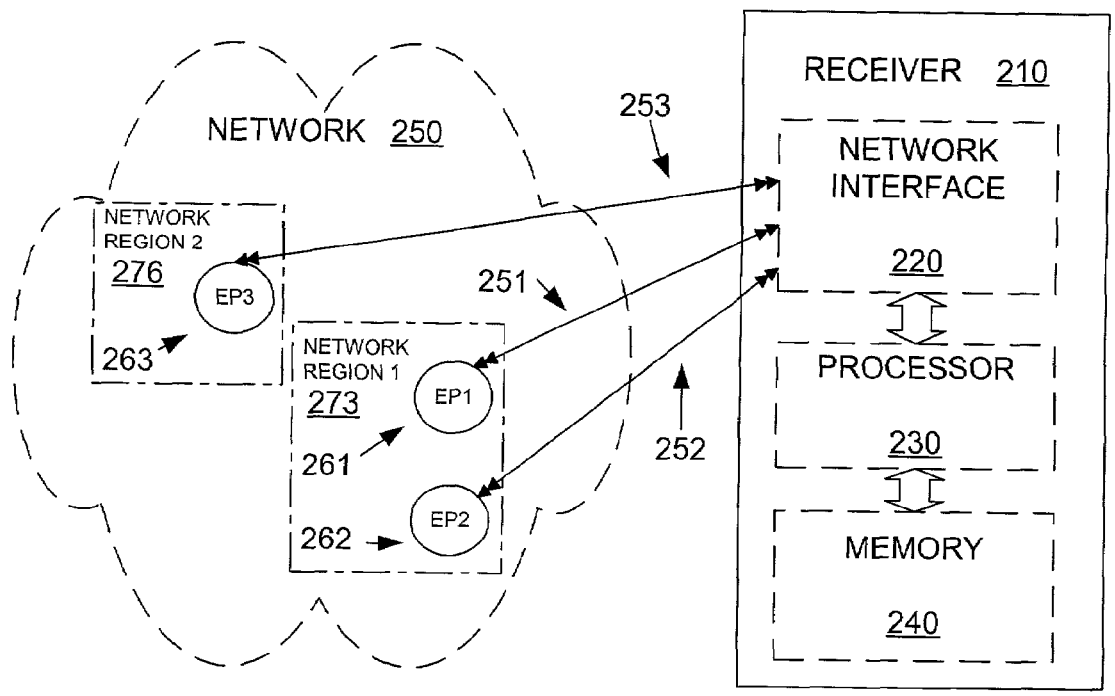
FIG. 2A is a diagram for illustrating a device according to an embodiment of the present invention.

Referring now to FIG. 2A, a receiver 210 is described according to an embodiment of the invention. Receiver 210 may be a standalone device, such as a network radio, a network television, etc. Or it might be part of a device capable of two-way communication, such as an IP telephone, a router, a network bridge such as a conference bridge, etc.

Receiver 210 includes a network interface 220, a processor 230 such as a CPU, and a memory 240. Receiver 210 is capable of communicating, through network interface 220, with network 250. Network 250 may be the internet, a wide area network (WAN), a local area network (LAN), an intranet, etc.

In some embodiments of the invention, receiver 210 is capable of establishing any one of connections 251, 252, 253 with endpoints EP1 261, EP2 262, EP3 263 respectively of network 250. Connections 251, 252, 253 are also known as channels.

In some of these embodiments, connections 251, 252, 253 are concurrent, although that is not necessary. Any one of connections 251, 252, 253 may be VoIP connections, although that is not necessary to practice the invention.

The remainder of this discussion proceeds for the case where connections 251, 252, 253 are concurrent. A person skilled in the art will be able to discern how to adapt the discussion for a single one of these connections.

Processor 230 identifies connections 251, 252 as being with endpoints EP1 261, EP2 262. Processor 230 classifies these endpoints as being in the same network region 273. Processor 230 also identifies connection 253 as being with endpoint EP3 263, which processor 230 classifies as being in another, different network region 276.

This differentiation of the endpoints by network regions is important. One major source of jitter is the number of hops, and the quality of the links between the source and the destination. Network regions are designated, for a receiving device, as those that are likely to have endpoints with uniform jitter characteristics. For example, VoIP calls that originate at a branch office to a gateway located in a central office will typically have a different average jitter than calls that originate in the central office to the same gateway.

There are a number of alternate ways of depicting a network. One such way would be to show the endpoints at the boundaries of network 250. The depiction of FIG. 2A was chosen to suggest that region 273 is "closer" to receiver 210 than region 276. This is to suggest that connections 251, 252, having endpoints in region 273 will be better (have less jitter) than connection 253 with endpoints in region 276.

Processor 230 then allocates a different portion of memory 240 as a jitter buffer for each one of these connections 251, 252, 253. This is described in more detail below.

Figure 2B:
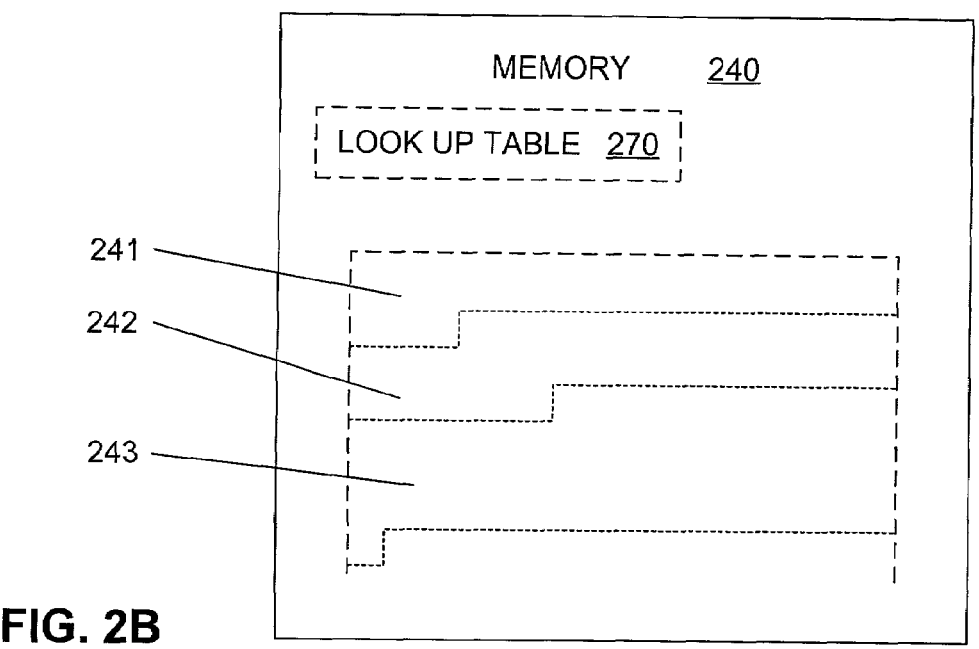
FIG. 2B is a diagram for illustrating jitter buffer allocations in a memory of the device of FIG. 2A.

Referring now to FIG. 2B, allocations of portions of memory 240 are described in more detail.

A look up table 270 stores in data form the known network regions 273, 276 of network 250, and expected jitter from endpoints in each region. Look up table 276 may be advantageously stored in the same memory 240, although that is not important for practicing the invention.

Portion 241 is allocated as jitter buffer for connection 251, and portion 242 is allocated for connection 252, as per values in look up table 270. It will be recognized that portions 241, 242 are of the same size, i.e. the same number of bytes (depicted by having similar areas). This is because connections 251, 252 are expected to have the same jitter, as they are with network endpoints 261, 262 that belong in the same network region 273.

In addition, portion 243 is allocated for connection 253, as per a value in look up of a record in table 270. It will be recognized that portion 243 is larger than portion 241, because network endpoint 263 is in network region 276.

It is readily apparent that the present invention may be implemented by one or more devices that include logic circuitry. It may also be implemented by a device that includes a dedicated processor system, which may include a microcontroller or a microprocessor. Such a device may be a Digital Signal Processing (DSP) chip.

The invention additionally provides methods, which are described below. Moreover, the invention provides apparatus that performs, or assists in performing the methods of the invention. This apparatus may be specially constructed for the required purposes, or it may comprise a general-purpose computer selectively activated or reconfigured by a computer program stored in the computer. The methods and algorithms presented herein are not necessarily inherently related to any particular computer or other apparatus. In particular, various general-purpose machines may be used with programs in accordance with the teachings herein, or it may prove more convenient to construct more specialized apparatus to perform the required method steps. The required structure for a variety of these machines will appear from this description.

Useful machines or articles for performing the operations of the present invention include general-purpose digital computers or other similar devices. In all cases, there should be borne in mind the distinction between the method of operating a computer and the method of computation itself. The present invention relates also to method steps for operating a computer and for processing electrical or other physical signals to generate other desired physical signals.

The invention additionally provides a program, and a method of operation of the program. The program is most advantageously implemented as a program for a computing machine, such as a general-purpose computer, a special purpose computer, a microprocessor, etc.

The invention also provides a storage medium that has the program of the invention stored thereon. The storage medium is a computer-readable medium, such as a memory, and is read by the computing machine mentioned above.

A program is generally defined as a sequence of steps leading to a desired result. These steps, also known as instructions, are those requiring physical manipulations of physical quantities. Usually, though not necessarily, these quantities take the form of electrical or magnetic signals capable of being stored, transferred, combined, compared, and otherwise manipulated or processed. When stored, they may be stored in any computer-readable medium. It is convenient at times, principally for reasons of common usage, to refer to these signals as bits, data bits, samples, values, elements, symbols, characters, images, terms, numbers, or the like. It should be borne in mind, however, that all of these and similar terms are associated with the appropriate physical quantities, and that these terms are merely convenient labels applied to these physical quantities.

This detailed description is presented largely in terms of flowcharts, display images, algorithms, and symbolic representations of operations of data bits within a computer readable medium, such as a memory. Such descriptions and representations are the type of convenient labels used by those skilled in programming and/or the data processing arts to effectively convey the substance of their work to others skilled in the art. A person skilled in the art of programming may use this description to readily generate specific instructions for implementing a program according to the present invention. For the sake of economy, however, flowcharts used to describe methods of the invention are not repeated in this document for describing software according to the invention.

Often, for the sake of convenience only, it is preferred to implement and describe a program as various interconnected distinct software modules or features, collectively also known as software. This is not necessary, however, and there may be cases where modules are equivalently aggregated into a single program with unclear boundaries. In any event, the software modules or features of the present invention may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network, such as a local access network (LAN), or a global network, such as the Internet.

In the present case, methods of the invention are implemented by machine operations. In other words, embodiments of the program of the invention are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

Methods of the invention are now described.

Figure 3A:
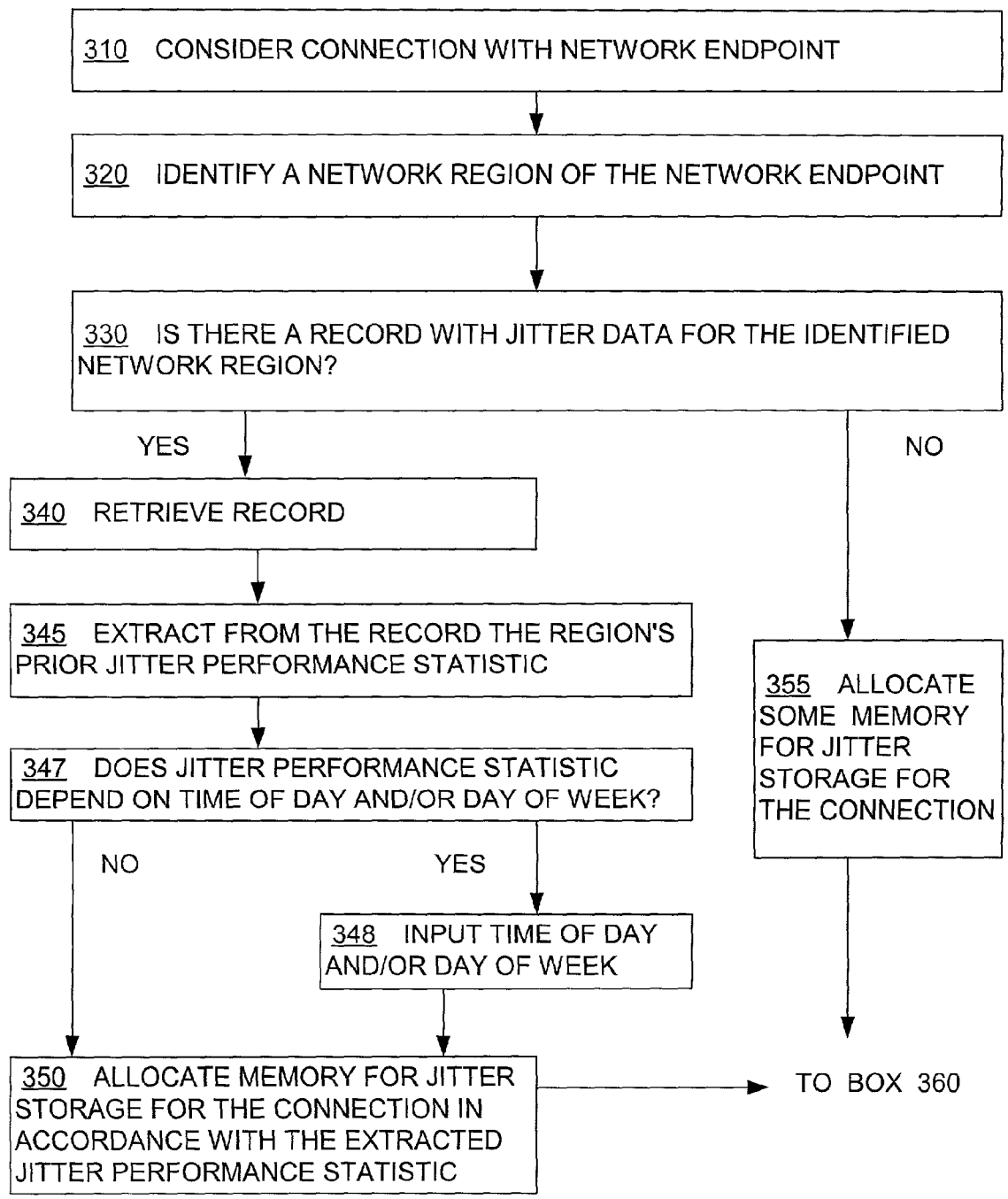
FIG. 3A and FIG. 3B are segments of a flowchart illustrating a method according to an embodiment of the present invention.
Figure 3B:
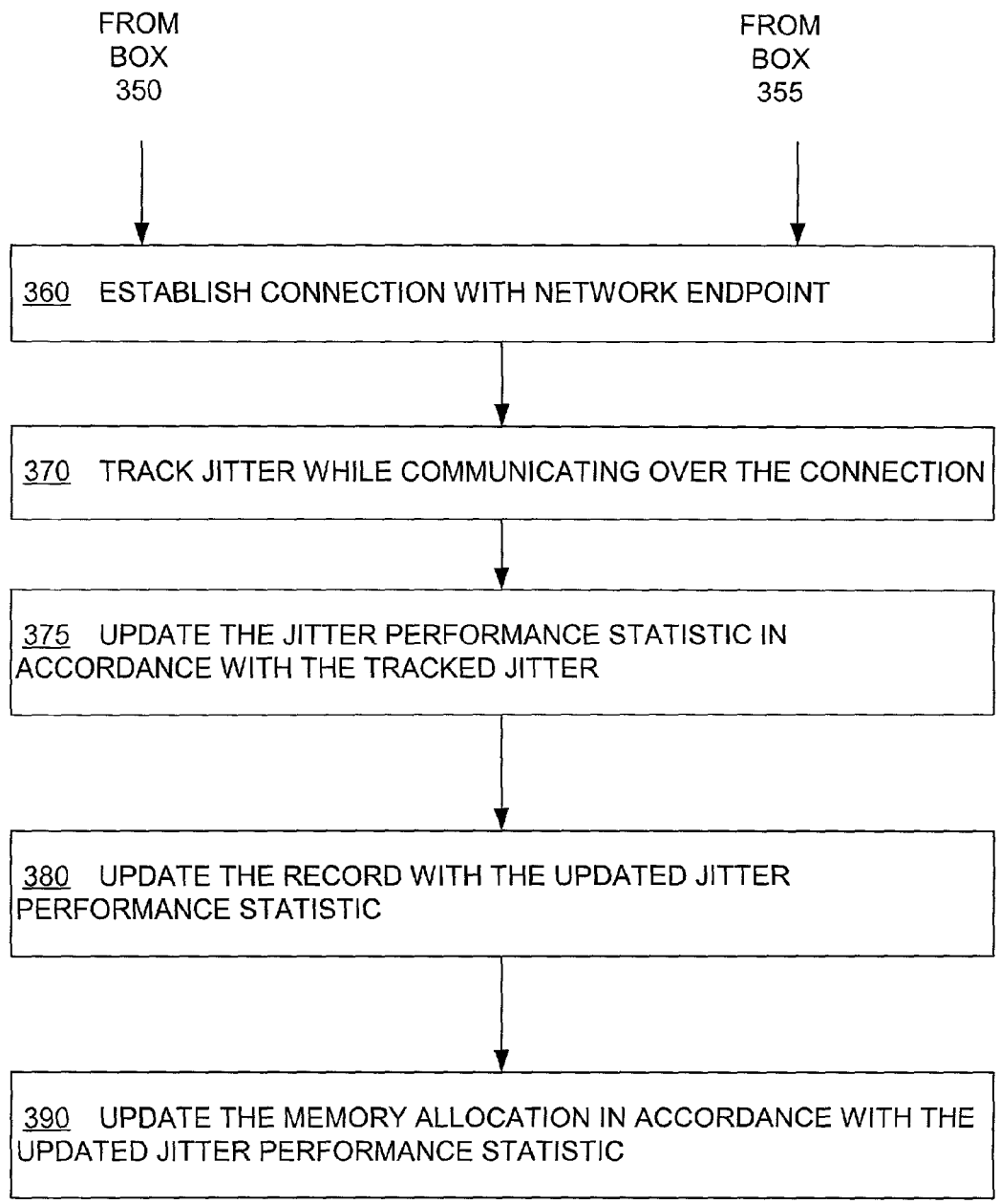

Referring now also to FIG. 3A and FIG. 3B, a flowchart having segments 300-A and 300-B is used to illustrate methods according to an embodiment of the invention.

According to a step 310, a connection 251 is considered through a network 250 with a first endpoint EP 261 of the network 250. Connection 251 may be a VoIP connection.

The connection being considered means a request is received for establishing the connection. The request may be received from the endpoint itself, or otherwise.

According to a next step 320, first endpoint 261 is identified to belong in a first region 273 in the network 250. In closed networks, such as a LAN, the region may be determined by the initial configuration, or by the location of the endpoint EP1 261 in the network 250. The location can be inferred from the network address. In open networks, such as the internet, the region may be inferred from an address of endpoint EP1 261, and classified according to further experience. For example, all endpoints from the same country may be classified as a single region, for a receiver outside the country. These may be identified by a country code in a network address.

According to a next step 330, it is inquired whether there is a record with jitter data for the identified first region 273, such as in look up table 270. This type of record is also known as a jitter record. As will occur from the below, a jitter record is likely to exist in a closed, pre-programmed network, or when a connection has been established before with any endpoint of the identified region.

If a jitter record exists then, according to a step 340, the jitter record is retrieved. Then, according to a next step 345, the jitter data is extracted from the jitter record.

It is preferred, but not necessary, that the jitter data include a performance statistic of a formerly tracked jitter of at least one endpoint in the first network region. The performance statistic may be determined from at least one of a cumulative average jitter and a cumulative jitter variability.

According to an optional next step 347, it is inquired whether the retrieved jitter performance statistic is dependent upon a time of a day. This is for the situation where calls during a certain time of the day (e.g. between 3:00 pm and 4:00 pm) experience different jitter than during other times of the day. If that is so, then the actual time of day is inputted, to better use the retrieved statistic.

According to the same step 347, it is optionally also inquired whether the retrieved jitter performance statistic is dependent upon a day of a week. This is for the situation where calls during a certain day of the week (e.g. Saturday) experience different jitter than during other days of the week (e.g. regular weekdays). If that is so, then the actual day of the week is inputted, to better use the retrieved statistic.

According to a next step 350, a first portion 241 of a memory 270 is allocated for jitter buffer storage for connection 251. The first portion 241 has a size determined the jitter data. For example, the size Jitter_Mem_Rqd[X] may be determined as follows:

$$\text{Jitter\_Mem\_Rqd}[X] = \text{Sizeof}[\text{Cml\_Avg\_Jitter}'[X]] + CVJ*\text{Sizeof}[\text{Cml\_Var\_Jitter}'[X]]$$

where Cml_Avg_Jitter'[X] is the cumulative average jitter that may have been derived from the last connection with an endpoint in region X, and Cml_Var_Jitter' [X] is the cumulative jitter variability that may have been derived from the last connection with an endpoint in region X.

CVJ is a suitable constant, that may depend on the amount of jitter that receiver 210 may be required to deal with. CVJ may be based on a quality of service (QoS) requirement. If jitter is distributed naturally, a value of CVJ=2 would cover adequately most jitter experienced in present day systems.

If, at step 330, a jitter record does not exist then, according to a step 355, some memory is allocated for jitter buffer of the connection. That may be standardized, or preset for connections with endpoints of uncharted network regions.

According to a next step 360, the first connection 251 is established. In this embodiment then, the first connection 251 is established after memory has been allocated for the jitter buffer. Equivalently, step 360 may be performed immediately after step 310, completely or in distributed sub-steps.

According to an optional next step 370, while communicating over the connection, a jitter of the connection is tracked. According to a next step 375, the jitter performance statistic may be upgraded.

For example, a jitter buffer allocation routine may keep track of two such statistics, namely an average jitter value, and a variability of a jitter. It is well advised that such be tracked with a slow running statistic, such as a slow running average.

For example, the cumulative average jitter may be tracked as follows:

$$\text{Cml\_Avg\_Jitter}'[X] = \text{Cml\_Avg\_Jitter}[X]*(M1-1)/M1 + \text{Avg\_Jitter}[X]/M1$$

where M1 is a large constant, and Avg_Jitter[X] is the average jitter derived from the last connection with an endpoint in region X.

Similarly, the cumulative jitter variability may be tracked by:

$$\text{Cml\_Var\_Jitter}'[X] = \text{Cml\_Var\_Jitter}[X]*(M2-1)/M2 + \text{Var\_Jitter}[X]/M2$$

where M2 is a large constant, and Var_Jitter[X] is the variability of jitter derived from the last connection with an endpoint in region X.

According to an optional next step 380, the updated jitter statistic is stored. It may be stored in the same memory, under the same record. The updated jitter statistic may optionally be stored along with the time of day, and/or day of the week.

The beneficial result of the invention is that, over time, the values of the memory portions 241, 242, 243 allocated for jitter buffers will stabilize dynamically at optimum values. Further, if the network 250 is updated, improved, expanded, etc., the stored values of the jitter will be adjusted. The adjusted values may be selected so as to maintain a desired quality of service.

According to an optional next step 390, the size of the first portion 241 of the memory allocation for the first connection is updated, while connection 251 is still active. The update is from a computed updated jitter performance statistic, and may be stored as a record in look up table 270.

Figure 4:
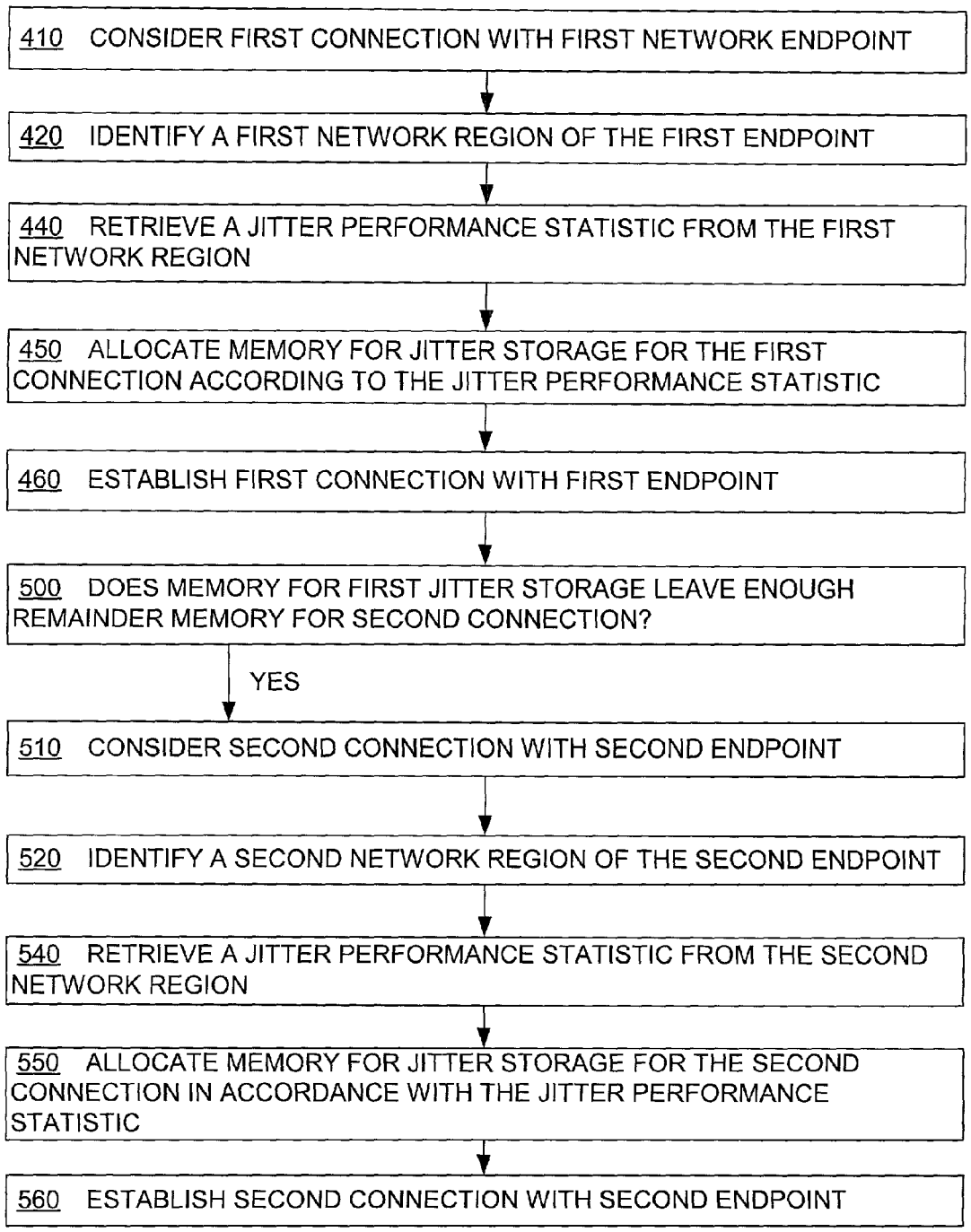
FIG. 4 is a flowchart illustrating a method according to another embodiment of the present invention.

Referring now to FIG. 4, a flowchart 400 is used to illustrate a method according to another embodiment of the invention. It will be appreciated that the method of FIG. 4 may be performed by any one of the devices that may perform the method of FIG. 3A and FIG. 3B. In addition, the method of FIG. 4 may be used by a Conference Bridge for carrying on simultaneous VoIP conversations, or even for configuring a Digital Signal Processing (DSP) device into in ad hoc conference bridge. Since the invention will save memory for each of the calls, more calls—or more conferences—may be accommodated.

According to a step 410, a first connection 251 is considered through a network 250 with a first endpoint EP1 261 of the network 250. This step may be performed similarly to step 310 of FIG. 3A.

According to a next step 420, a first region 273 in the network 250 is identified of the first endpoint 261. This step may be performed similarly to step 320 of FIG. 3A.

According to a next step 440, a jitter performance statistic is retrieved from the first network region 273. This may be performed similarly to steps 340 and 345 of FIG. 3A.

According to a next step 450, a first portion 241 of a memory is allocated for jitter storage for the first connection 251. This may be performed similarly to step 350 of FIG. 3A.

According to a next step 460, the first connection 251 is actually established. This may be performed similarly to step 360 of FIG. 3B, and in a different order, as described above.

According to an optional next step 500, it is inquired whether there is enough memory remaining to add another call. More particularly, it is inquired whether allocating the first portion 241 leaves enough remainder to fit another call.

If the answer is yes then, according to a next step 510, a second connection 253 is established through a network 250 with a second endpoint EP3 263 of the network 250. This step may be performed similarly to step 410.

According to a next step 520, a second region 276 in the network 250 is identified of the first endpoint 263. This step may be performed similarly to step 420.

According to a next step 540, a jitter performance statistic is retrieved from the second network region 276. This step may be performed similarly to step 440.

According to a next step 550, a second portion 243 of a memory is allocated for jitter storage for the second connection 253. This may be performed similarly to step 450.

According to a next step 560, the second connection 253 is actually established. This may be performed similarly to step 460 of FIG. 3, and with the same considerations.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments as disclosed and illustrated herein are not to be considered in a limiting sense. Indeed, it should be readily apparent to those skilled in the art in view of the present description that the invention may be modified in numerous ways. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and subcombinations of features, functions, elements and/or properties may be presented in this or a related document.

The invention claimed is:

1. A device comprising:
   a network interface for coupling to a network;
   a memory; and
   a processor coupled with the network interface, wherein the processor is adapted to:
   consider a first connection through a network with a first endpoint of the network;
   identify a first region in the network of the first network endpoint;
   retrieve a first jitter record for the first network region; and
   allocate a first portion of a memory for jitter buffer storage for the first connection, the first portion having a size in accordance with first jitter data in the first jitter record
   wherein the processor is further adapted to:
   consider a second connection through the network with a second endpoint of the network;
   identify a second region in the network of the second network endpoint;
   retrieve a second jitter record for the second network region; and
   allocate a second portion of the memory for jitter buffer storage for the second connection, the second portion having a size in accordance with second jitter data in the second jitter record.

2. The device of claim 1, wherein
   said first connection is a VoIP connection.

3. The device of claim 1, wherein the processor is further adapted to:
   determine whether allocating the first portion of the memory leaves enough remainder memory for the second portion of the memory.

4. The device of claim 1, wherein
   said first jitter record contains a first jitter performance statistic of a formerly tracked jitter of at least one endpoint in the first network region.

5. The device of claim 4, wherein
   the first jitter performance statistic is determined from at least one of a cumulative average jitter and a cumulative jitter variability.

6. The device of claim 4, wherein the processor is further adapted to:
   establish the first connection;
   track a jitter while communicating over the first connection; and
   update the first jitter performance statistic in accordance with the tracked jitter.

7. The device of claim 1, wherein
   said second connection is a VoIP connection.

8. A device comprising:
   means for considering a first connection through a network with a first endpoint of the network;
   means for identifying a first region in the network of the first network endpoint;
   means for retrieving a first jitter record for the first network region; and
   means for allocating a first portion of a memory for jitter buffer storage for the first connection, the first portion having a size in accordance with first jitter data in the first jitter record,
   the first connection is a VoIP connection, means for considering a second connection through the network with a second endpoint of the network;

means for identifying a second region in the network of the second network endpoint;

means for retrieving a second jitter record for the second network region; and means for allocating a second portion of the memory for jitter buffer storage for the second connection, the second portion having a size in accordance with second jitter data in the second jitter record.

9. The device of claim 8, further comprising:

means for determining whether allocating the first portion of the memory leaves enough remainder memory for the second portion of the memory.

10. An article comprising: a storage medium, said storage medium having stored thereon instructions, that, when executed by at least one device, result in:

considering a first connection through a network with a first endpoint of the network;

identifying a first region in the network of the first network endpoint;

retrieving a first jitter record for the first network region; and allocating a first portion of a memory for jitter buffer storage for the first connection, the first portion having a size in accordance with first jitter data in the first jitter record, wherein the instructions further result in:

considering a second connection through the network with a second endpoint of the network;

identifying a second region in the network of the second network endpoint;

retrieving a second jitter record for the second network region; and allocating a second portion of the memory for jitter buffer storage for the second connection, the second portion having a size in accordance with second jitter data in the second jitter record.

11. The article of claim 10, wherein the instructions further result in:

determining whether allocating the first portion of the memory leaves enough remainder memory for the second portion of the memory.

12. A method comprising:

considering a first connection through a network with a first endpoint of the network;

identifying a first region in the network of the first network endpoint;

retrieving a first jitter record for the first network region; and allocating a first portion of a memory for jitter buffer storage for the first connection, the first portion having a size in accordance with first jitter data in the first jitter record, the first connection is a VoIP connection, considering a second connection through the network with a second endpoint of the network;

identifying a second region in the network of the second network endpoint;

retrieving a second jitter record for the second network region; and allocating a second portion of the memory for jitter buffer storage for the second connection, the second portion having a size in accordance with second jitter data in the second jitter record.

13. The method of claim 12, further comprising:

determining whether allocating the first portion of the memory leaves enough remainder memory for the second portion of the memory.

\* \* \* \* \*